(12) United States Patent
Korman et al.

(10) Patent No.: US 12,493,549 B2
(45) Date of Patent: Dec. 9, 2025

(54) DATA STORAGE APPARATUS AND METHOD OF DATA MANAGEMENT IN THE DATA STORAGE APPARATUS

(71) Applicant: Huawei Cloud Computing Technologies Co., Ltd., Guizhou (CN)

(72) Inventors: Yigal Korman, Hod Hasharon (IL); Amit Golander, Hod Hasharon (IL); Ben-Shahar Belkar, Hod Hasharon (IL)

(73) Assignee: HUAWEI CLOUD COMPUTING TECHNOLOGIES CO. LTD., Guizhou (CN)

( * ) Notice: Subject to any disclaimer, the term of this patent is extended or adjusted under 35 U.S.C. 154(b) by 0 days.

(21) Appl. No.: 18/633,976

(22) Filed: Apr. 12, 2024

(65) Prior Publication Data

US 2024/0256437 A1    Aug. 1, 2024

Related U.S. Application Data

(63) Continuation of application No. PCT/EP2021/078151, filed on Oct. 12, 2021.

(51) Int. Cl.
*G06F 12/00* (2006.01)
*G06F 9/54* (2006.01)
*G06F 12/02* (2006.01)

(52) U.S. Cl.
CPC .......... *G06F 12/023* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 2015/0234597 A1* | 8/2015 | He | G06F 3/0655 710/74 |
| 2015/0248254 A1* | 9/2015 | Matsunaga | G06F 3/0685 711/5 |
| 2017/0285997 A1 | 10/2017 | Stabrawa et al. | |
| 2019/0146718 A1* | 5/2019 | Ben Dayan | G06F 3/0662 711/154 |
| 2019/0286574 A1* | 9/2019 | Chen | H04L 67/1097 |

* cited by examiner

*Primary Examiner* — Daniel D Tsui
(74) *Attorney, Agent, or Firm* — Conley Rose, P.C.

(57) ABSTRACT

A method of data management in a data storage apparatus includes determining that a memory region (MR) stored in a first storage tier is suitable for hibernation. A tier-down operation is executed to move the MR to a second storage tier. In response to a remote direct memory access (RDMA) request to the MR from a client, a notification response is sent to the client to notify the client of the hibernated status of the MR. Moreover, in response to receiving a remote procedure call (RPC), from the client, the requested memory access is provided to the client. The requested memory access is provided to the client without any additional round-trip times (RTTs).

20 Claims, 3 Drawing Sheets

DATA STORAGE APPARATUS AND METHOD OF DATA MANAGEMENT IN THE DATA STORAGE APPARATUS

CROSS-REFERENCE TO RELATED APPLICATIONS

This is a continuation of International Patent Application No. PCT/EP2021/078151 filed on Oct. 12, 2021, the disclosure of which is hereby incorporated by reference in its entirety.

TECHNICAL FIELD

The present disclosure relates generally to the field of cloud storage and more specifically, to a data storage apparatus and a method of data management in the data storage apparatus, for example, for hardware-assisted remote direct access to the data storage apparatus (i.e., a multi-tiered storage system).

BACKGROUND

Distributed storage systems, typically employ multiple tiers of storage hardware (e.g., a persistent memory, a flash memory, a spindle data storage, a tape storage) to provide a balance between good return on investment (ROI), and good performance, such as throughput and latency. Examples of the distributed storage systems, include but are not limited to a server, an enterprise distributed storage, cloud (or networked) distributed storage), and the like. Generally, the multiple tiers of the storage hardware are generally divided into a slower tier and a faster tier that are used to store data of different types. Typically, if the data stored in the slower tier of the storage hardware becomes hot (i.e., data is accessed often), then a tier-up operation is performed by the distributed storage systems, such as by moving the corresponding data from the slower tier to the faster tier of the storage hardware. Alternatively, if data stored in the faster tier becomes cold (i.e., data is not accessed anymore), then tier-down operation is performed, such as by moving the corresponding data from the faster tier to the slower tier of the storage hardware. Such tier-up and tier-down operations are generally performed to improve an access performance of the distributed storage system. Typically, a client that is communicatively coupled with the distributed storage system, must be aware of the location of the data (i.e., where data resides) so that the client can request access from the corresponding tier of the storage hardware.

Currently, several conventional methods exist for informing clients that data is moved between tiers. In a first example, one conventional method may be to explicitly inform all clients that the data has been moved. However, such conventional method is not scalable if the number of clients is large enough and thus not practical enough for adoption. In another example, in some conventional methods, it is required that clients (i.e., client devices) must contact the distributed storage system (i.e., a server), and check if the data is available before each access. However, in such cases, multiple round-trip times (RTTs) are required to access the data from the distributed storage system, which is not desirable and not optimal. In yet another example, in some conventional methods, it may be requited that all clients can request their data, and then the distributed storage system (i.e., the server) will send data from whichever tier it is available on the distributed storage system. However, such conventional methods are neither scalable as it involves use of limited resources, such as a central processing unit (CPU) at the server side nor optimal as multiple RTTs are also required to access the data. Therefore, existing methods and systems are inefficient and ineffective to handle data management in terms of data tiering without impacting performance or scalability. Thus, there exists a technical problem of how to improve the performance of the distributed storage system, such as the performance of multiple tiers of the storage hardware, to optimally handle data tiering without impacting the performance or scalability.

Therefore, in light of the foregoing discussion, there exists a need to overcome the aforementioned drawbacks associated with the conventional distributed storage system.

SUMMARY

The present disclosure provides a data storage apparatus and a method of data management in the data storage apparatus. The present disclosure provides a solution to the existing problem of how to improve the performance of the distributed storage system, such as the performance of multiple tiers of the storage hardware, to optimally handle data tiering without impacting the performance or scalability. An objective of the present disclosure is to provide a solution that overcomes at least partially the problems encountered in other approaches and that provides an improved data storage apparatus and a method of data management in the data storage apparatus. The method is beneficial to provide hardware-assisted remote direct access to the data storage apparatus (or multi-tiered storage systems) for improved performance of the data storage apparatus in terms of improving data tiering handling capability without impacting the performance or scalability.

One or more objectives of the present disclosure is achieved by the solutions provided in the enclosed independent claims. Advantageous implementations of the present disclosure are further defined in the dependent claims.

In one aspect, the present disclosure provides a method of data management in a data storage apparatus determining that a memory region (MR) stored in a first storage tier is suitable for hibernation, executing a tier-down operation to move the MR to a second storage tier, and in response to a remote direct memory access (RDMA) request to the MR from a client, sending a notification response to the client to notify the client of the hibernated status of the MR, and in response to receiving a remote procedure call (RPC) from the client, providing the requested memory access to the client.

The method provides an advanced feature on the RDMA protocol in which it is possible to determine the hibernation status, and even hibernate the MR but instead of triggering a critical error like in conventional systems, the access to this MR from the client will return a special reply on the completion queue (CQ) describing that this MR is in hibernate state. This prevents MR invalidation, and do not impact performance. Thus, in case of "hibernated MR" reply (i.e., by notifying the client of the hibernated status), the client can decide to either contact the data storage apparatus and request a tier-up operation or, if the I/O request is small and infrequent, send the request ad-hoc (via the RPC) to be handled by the data storage apparatus. Thus, the method improves performance of the data storage apparatus in terms of improving data tiering handling capability without impacting the performance or scalability.

Moreover, as compared to the conventional approaches, the client needs not to contact the server CPU regarding the availability of data from the MR before each requested memory access. Furthermore, the method provides an optimal solution because the requested memory access is provided to the client without any additional RTTs, and also without impacting the performance or scalability of access to the first storage tier.

In a further implementation form, the determination of suitability for hibernation is made based on a data access history for the MR.

As the data access history provides an indication whether the data access for the particular MR has been too frequent or infrequent or no recent data access, thus the determination of suitability for hibernation can be accurately made.

In a further implementation form, the tier-down operation is executed by a server CPU of the data storage apparatus.

The tier-down operation is executed by the server CPU based on the accurate determination of the hibernation status, which contributes to reduce total storage costs while ensuring performance.

In a further implementation form, executing the tier-down operation includes sending a server CPU call to a server RDMA network interface card (RNIC), of the data storage, updating, by the server RNIC, an MR state, waiting, by the server RNIC, for one or more RDMA transactions to complete before sending a confirmation response to the server CPU, and moving, by the server CPU in response to the confirmation response, the MR to the second storage tier.

It is known that access control is managed by memory regions (MRs) that can be registered to the server RNIC and invalidated when access is no longer allowed. Thus, the updating of the MR state is beneficially executed by the server RNIC. Moreover, before moving the MR to the second storage tier, the completion of the ongoing RDMA transactions is ensured (i.e., the server RNIC waits for all inflight direct memory access (DMA) transactions to end) to avoid any impact on performance, and for safe movement of the MR to the second storage tier.

In a further implementation form, executing the tier-down operation further comprises sending, by the server RNIC, a hibernate error to the server CPU if one or more new RDMA write operations are incoming, and determining, by the server CPU, whether to force or cancel the tier-down operation.

In this implementation, if one or more new RDMA write operations are incoming, then the server CPU is capable to determine whether to force or cancel the tier-down operation, without impacting the performance of the first storage tier. The server CPU is capable to decide if it is required to modify the hibernate status again with a force indication where new inflight packets hitting the MR may be blocked.

In a further implementation form, the first storage tier is persistent memory.

As the first storage tier is persistent memory, thus the first storage tier acts as a hot-data access tier that has a shorter access time. The first storage tier further allows relatively fast random access for reads and writes.

In a further implementation form, the RDMA request is a read or write request including an RDMA key and virtual address of the corresponding data.

Beneficially, the client can access the corresponding data from the MR with one-sided read or write operations without involving the server CPU of the data storage apparatus. The virtual address may guide the client to the MR of the corresponding data.

In a further implementation form, the notification response is sent to the client by a server RNIC, of the data storage apparatus.

Beneficially, the server CPU of the data storage apparatus is not involved in sending the notification response to the client.

In a further implementation form, the notification response comprises a work completion error, which is configured not to tear down a connection to the client.

Beneficially, the notification response that includes the work completion error prevents invalidation of the QP connection without affecting any performance of orthogonal input/output (I/O) operations from other threads to other MRs that use the same connection (QP connection).

In a further implementation form, the client RPC includes an RDMA key, virtual address, and logical offset of the corresponding data.

By virtue of the RDMA key, the virtual address, and the logical offset of the corresponding data, the client can now access the corresponding data from the MR without involving the server CPU of the data storage apparatus.

In a further implementation form, the client RPC includes a request for adhoc data access and the requested memory access is provided indirectly by a server CPU of the data storage from the second storage tier.

Beneficially, if the I/O request is small and infrequent, the client RPC includes the request for adhoc data access via the RPC to be handled by the server CPU in case of the notification of the hibernation status of the MR. The requested memory access of the MR is provided indirectly by the server CPU of the data storage apparatus from the second storage tier without impacting the performance related to access to the first storage tier.

In a further implementation form, executing the tier-up operation further comprises mapping, by the server RNIC, from a former virtual address to the newly assigned virtual address.

By virtue of mapping the server RNIC from the former virtual address to the newly assigned virtual address, the client can access the MR through the newly assigned virtual address.

In another aspect, the present disclosure provides a computer-readable medium comprising instructions which, when executed by a processor, cause the processor to perform the method of any preceding claim.

The computer-readable medium provides the advantages and technical effects of the method of the present disclosure.

In yet another aspect, the present disclosure provides a data storage apparatus comprising a first storage tier, a second storage tier, and a server CPU configured to determine that an MR stored in a first storage tier is suitable for hibernation, execute a tier-down operation to move the MR to a second storage tier, and provide the requested memory access to the client in response to receiving a RPC from the client, and a server RNIC configured to send a notification response to the client to notify the client of the hibernated status of the MR in response to a remote direct memory access, RDMA, request to the MR from a client.

The data storage apparatus provides the advantages and technical effects of the method of the present disclosure.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
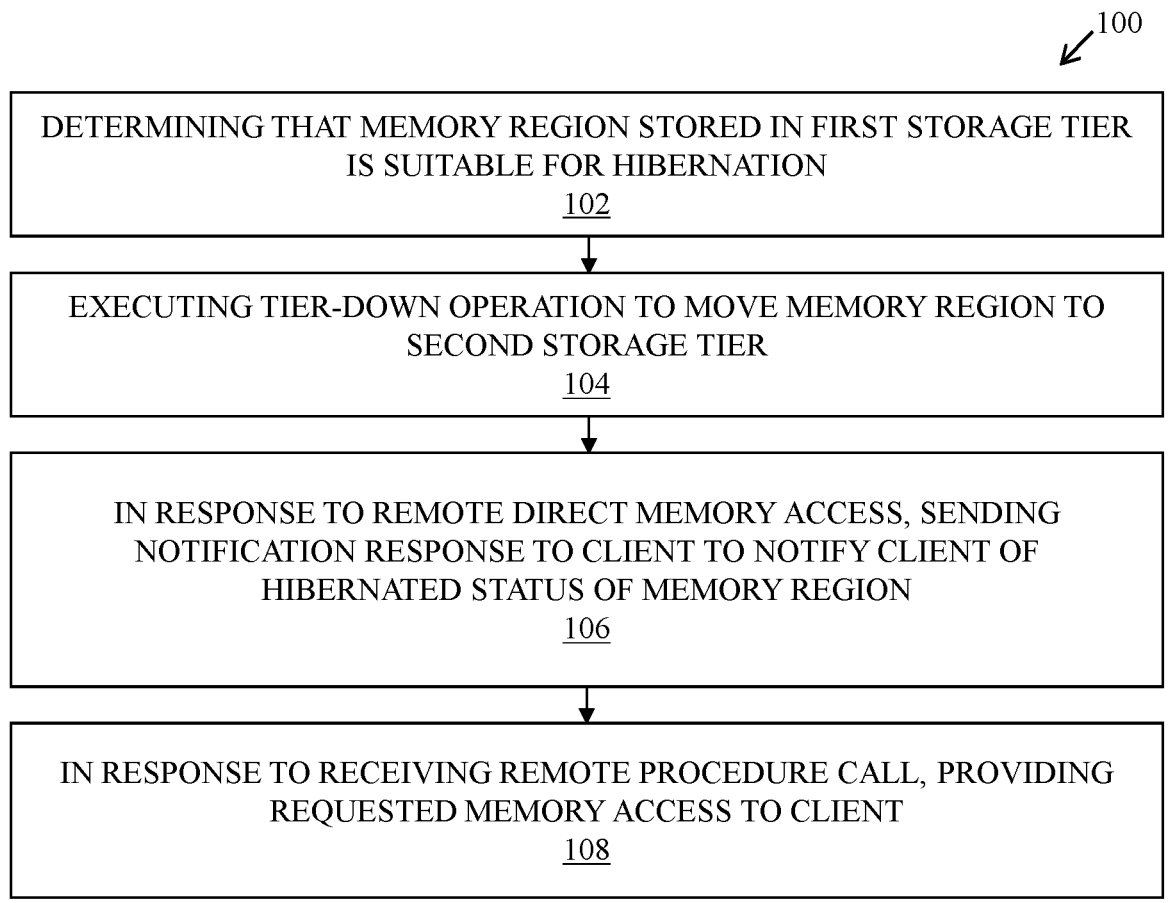
FIG. 1 is a flowchart of a method of data management in a data storage apparatus, in accordance with an embodiment of the present disclosure.

FIG. 1 is a flowchart of a method of data management in a data storage apparatus, in accordance with an embodiment of the present disclosure. With reference to FIG. 1, there is shown a flowchart of a method 100 of data management in a data storage apparatus described, for example, in FIG. 2. The method 100 includes steps 102 to 108.

In one aspect, the present disclosure provides a method 100 of data management in a data storage apparatus. The data storage apparatus includes a non-volatile type of computer storage media, such as a first storage tier, and a second storage tier. In an example, the data storage apparatus may be a server or a part of the server. The data storage apparatus also includes a server CPU that is used to perform various functions. The method 100 is useful to improve the performance of the data storage apparatus in terms of improving data tiering handling capability without impacting the performance or scalability to access the first storage tier (i.e., a hot tier).

At step 102, the method 100 comprises, determining that an MR stored in a first storage tier is suitable for hibernation. The MR stores data. Further, determination of suitability for hibernation can be accurately made based on activity on the data stored in the MR. For example, if the data stored in the MR becomes cold (i.e., not accessed often), then the MR is suitable for hibernation. The hibernation is used to reduce unnecessary total storage costs while ensuring performance.

In accordance with another embodiment, the first storage tier is a persistent memory. In other words, the first storage tier of the data storage apparatus acts as a hot-data access tier that has a shorter access time as compared to the second storage tier. Hence, the first storage tier allows relatively fast random access for reads and writes. Moreover, the first storage tier may also be used for data caching, which refers to storing data such that future requests for that data can be served faster. In an implementation, the first storage tier may be a solid-state drive (SSD) in an example.

In accordance with an embodiment, the determination of suitability for hibernation is made by the server CPU of the data storage apparatus. In an implementation, the MR includes the data, and it is determined by the server CPU of the data storage apparatus if the data is accessed recently or not. Thereafter, based on the status of the data, the server CPU is configured to determine accurately that the MR stored in the first storage tier is suitable for hibernation or not. The tier-down operation is executed by the server CPU based on the accurate determination of the hibernation status, which contributes to reduce total storage costs while ensuring performance.

In accordance with an embodiment, the determination of suitability for hibernation is made based on a data access history for the MR. In an example, the data access history for the MR is stored in a memory of the data storage apparatus. As the data access history provides an indication whether the data access for the particular MR has been too frequent or infrequent or no recent data access (e.g., based on a number of read and write requests), thus the determination of suitability for hibernation can be accurately made.

In accordance with an embodiment, the MR is determined to be suitable for hibernation when the MR is not recently and/or regularly accessed. In an implementation, if the data access history of the MR is not available (i.e., no data access history exits) that means the MR is not recently accessed and/or not regularly accessed.

At step 104, the method 100 comprises, executing a tier-down operation to move the MR to a second storage tier. In other words, if the MR is suitable for hibernation (e.g., not recently/often accessed), then the MR is moved from the first storage tier (i.e., hot tier) to the second storage tier (i.e., cold tier), such as by executing the tier-down operation.

In accordance with an embodiment, the second storage tier has one or more of a longer latency, lower throughput, and lower cost in comparison with the first storage tier. In other words, the second storage tier has comparatively less performance than the first storage tier, but a lower cost as compared to the first storage tier. The second storage tier is flash or spindle, or tape memory. Therefore, the second storage tier has a larger access time as compared to the first storage tier.

In accordance with another embodiment, the tier-down operation is executed by the server CPU of the data storage apparatus. The tier-down operation executed by the server CPU based on the accurate determination of the hibernation status further contributes to reduce total storage costs while ensuring performance.

In accordance with another embodiment, executing the tier-down operation includes sending a server CPU call to a server RNIC of the data storage apparatus, and updating, by the server RNIC, an MR state. The method 100 further comprises, waiting, by the server RNIC, for one or more RDMA transactions to complete before sending a confirmation response to the server CPU, and moving, by the server CPU in response to the confirmation response, the MR to the second storage tier. Firstly, the server CPU of the data storage apparatus decides to execute the tier-down operation, such as to move the MR from the first storage tier to the second storage tier. The server CPU executes the server CPU call to the server RNIC of the data storage apparatus, such as to update the MR state. Thereafter, the MR state of the MR is updated by the server RNIC. The server RNIC further wait for one or more RDMA transactions to complete (i.e., wait for inflight DMA transactions of the MR to end). After that, the server RNIC returns a response, such as the confirmation response to the server CPU that the MR state of the MR is updated. As a result, the server CPU is now aware that no access to the MR can be made and can safely move the MR from the first storage tier to the second storage tier. In addition, the server CPU call allows an access control that is managed by the MR that can be registered to the server RNIC and the access control can be invalidated when access to the MR is no longer allowed.

Typically, and in existing systems, access to invalidate the MR triggers a critical network error and closes the RDMA connection between a client and the server CPU. Moreover, it is known that access control is managed by MRs that can be registered to the server RNIC and invalidated when access is no longer allowed. Thus, the updating of the MR state is beneficially executed by the server RNIC in the present disclosure. Moreover, before moving the MR to the second storage tier, the completion of the ongoing RDMA transactions is ensured (i.e., the server RNIC waits for all inflight DMA) transactions to end) to avoid any impact on performance, and for safe movement of the MR to the second storage tier.

In accordance with another embodiment, executing the tier-down operation further comprises sending, by the server RNIC, a hibernate error to the server CPU if one or more new RDMA write operations are incoming, and determining, by the server CPU, whether to force or cancel the tier-down operation. In an implementation, the server RNIC waits for inflight DMA transactions of the MR to end. Moreover, at that stage, one or more new RDMA write operations may be incoming (i.e., new incoming packets are in flight). Thereafter, the server RNIC sends back the hibernate error (or completion error for hibernation request) to the server CPU. The hibernate error allows the server CPU to determine and decide whether to force the tier-down operation or to cancel the tier-down operation (i.e., drop tier-down request) because the MR is now "hot" again. Thus, the server CPU is capable to determine whether to force the tier-down operation or to cancel the tier-down operation, without impacting the performance or scalability of access to the first storage tier. The server CPU is capable to decide if it is required to modify the hibernate status again with a force indication where new inflight packets hitting the MR may be blocked. In an example, the server CPU forces the tier-down operation with a force indication, such as to modify the hibernate state of the MR (i.e., to change it into a wakeup state). The force indication includes blocking new inflight packets hitting the MR and move the MR to hibernate immediately, and only drain the RDMA requests.

At step 106, the method 100 comprises, sending a notification response to a client so as to notify the client of the hibernated status of the MR, in response to a RDMA, request to the MR from the client. Typically, the client contacts the data storage apparatus, by sending the RDMA request to the MR. In an implementation, the RDMA request provides high performance in enterprise and cloud (or networked) distributed storage, such as in the data storage apparatus. Beneficially, the RDMA request provides one-sided operations (e.g., read, write) that allow access to memory, and also to the MR without involving the server CPU on a target (e.g., responder) side, such as at the data storage apparatus. Thus, in response to the RDMA request, the server RNIC returns the notification response to the client that the MR is in hibernate state. In other words, requesting access to the MR from the client will return a special reply, such as the notification response on the CQ describing that the MR is in hibernate state. Thus, the method 100 provides an advanced feature on the RDMA protocol in which it is possible to determine the hibernation status, and even hibernate the MR but instead of triggering a critical error like in conventional systems, the access to this MR from the client will return a special reply on the CQ describing that this MR is in hibernate state. This prevents MR invalidation, and do not impact performance. Thus, in case of "hibernated MR" reply (i.e., by notifying the client of the hibernated status), the client can decide to either contact the data storage apparatus and request a tier-up operation or, if the I/O request is small and infrequent, send the request ad-hoc (via the RPC) to be handled by the data storage apparatus.

In accordance with another embodiment, the RDMA request is a read or write request including an RDMA key and virtual address of the corresponding data. In an implementation, the RDMA key (i.e., r_key) is a registered key that is configured to store the read or write request. Moreover, the virtual address may guide the client to the MR of the corresponding data. Beneficially, the client can now access the corresponding data from the MR with one-sided read or write operations without involving the server CPU of the data storage apparatus.

In accordance with another embodiment, the notification response is sent to the client by the server RNIC of the data storage apparatus. Beneficially, the server CPU of the data storage apparatus is not involved in sending the notification response to the client.

In accordance with another embodiment, the notification response comprises a work completion error, which is configured not to tear down a connection to the client. In an implementation, the client is configured to send the RDMA request to the MR. However, there exists a critical error (e.g., QP connection error state), such as the work completion error at the data storage apparatus. Thereafter, the server RNIC of the data storage apparatus is configured to send the notification response to the client, where the notification response includes the work completion error. The work completion error is used not to tear down the connection to the client (or to keep the connection to the client). Beneficially, the notification response that includes the work completion error prevents invalidation of the QP connection without affecting any performance of orthogonal input/output (I/O) operations from other threads to other MRs that use the same connection (e.g., QP connection).

At step 108, the method 100 comprises, providing the requested memory access to the client, in response to receiving a RPC, from the client. In other words, the client is configured for sending the RPC to the server CPU. The RPC is used for providing the requested memory access to the client. Beneficially as compared to the conventional approaches, the client needs not to contact the server CPU regarding the availability of data from the MR before each requested memory access. Furthermore, the method 100 provides an optimal solution, because the requested memory access is provided to the client without any additional RTTs, and also without impacting the performance of to the first storage tier. Thus, the method 100 improves performance of the data storage apparatus in terms of improving data tiering handling capability without impacting the performance or scalability. Moreover, the method 100 is beneficial because it provides hardware-assisted remote direct access to the data storage apparatus (i.e., a multi-tiered storage system).

In accordance with another embodiment, the client RPC includes an RDMA key, virtual address, and logical offset of the corresponding data. Therefore, the client can now access the corresponding data from the MR without involving the server CPU of the data storage apparatus in a simplified manner.

In accordance with another embodiment, the client RPC includes a request for adhoc data access and the requested memory access is provided indirectly by the server CPU of the data storage apparatus from the second storage tier. If the I/O request is small and infrequent, the client RPC includes the request for adhoc data access via the RPC to be handled by the server CPU in case of the notification of the hibernation status of the MR. The requested memory access of the MR is provided indirectly by the server CPU of the data storage apparatus from the second storage tier without impacting the performance related to access to the first storage tier.

In accordance with another embodiment, the client RPC includes a request for tier-up of the virtual address to the MR and the requested memory access is provided by executing a tier-up operation. The notification response is sent to the client by the server RNIC of the data storage apparatus. Moreover, the notification response describes that the MR is in a hibernated state. Thereafter, the client may decide to contact the server RNIC of the data storage apparatus and to send the RPC for tier-up of the MR. As a result, the requested memory access is provided to the client by executing the tier-up operation, such as by moving the MR from the second storage tier to the first storage tier.

In accordance with another embodiment, the tier-up operation is executed by a server CPU of the data storage apparatus. In other words, the server CPU of the data storage apparatus is configured to efficiently move back the MR from the second storage tier to the first storage tier in the tier-up operation.

In accordance with another embodiment, executing the tier-up operation includes sending a server CPU call to the server RNIC of the data storage apparatus, and updating, by the server RNIC, the MR state and assigning a virtual address to the MR. Firstly, the server CPU of the data storage apparatus decides to execute the tier-up operation, such as to move the MR from the second storage tier to the first storage tier. The server CPU further moves the data to a specific virtual address of the first storage tier. After that, the server CPU executes the server CPU call to the server RNIC of the data storage apparatus, such as for requesting that the MR will be moved to wakeup state and at a specific virtual address (e.g., via physical address (PA) mapping). In an example, the MR is moved to a wakeup state and at a previously registered specific virtual address of the data. In another example, the MR is moved to the wakeup state at the specific virtual address, which can be different from the previously registered virtual address of the data. Thereafter, the MR state of the MR is updated by the server RNIC and also informed to the client that the MR is now woken up. The server CPU further shares the virtual address to the MR to the client. As a result, the client can access the MR, such as through an originally registered key (i.e., the RDMA key (r_key)).

In accordance with another embodiment, executing the tier-up operation further comprises mapping, by the server RNIC, from a former virtual address to a newly assigned virtual address. As, the tier-up operation is executed to move the MR from the second storage tier to the first storage tier, therefore the virtual address of the MR is also changed from the former virtual address to the newly assigned virtual address. For example, the former virtual address belongs to the second storage tier, and the newly assigned virtual address belongs to the first storage tier. As a result, the client can access the MR through the newly assigned virtual address. In an example, the client can access the MR with a previous remote MR information with no change.

In accordance with another embodiment, executing the tier-up operation further comprises sending, by the server CPU, the RPC to the client to notify the client of the completion of the tier-up operation. The server CPU is configured to execute the tier-up operation, where the RPC is sent by the server CPU to the client, such as to notify the client that the tier-up operation is completed. The RPC may be leveraged for providing the requested memory access to the client. In an example, the client further responds back with an acknowledgment message regarding receipt of the RPC.

In an implementation, the client can be notified of the tier-up operation by polling the MR, such as through a client access algorithm. In this algorithm, the client has the MR along with access to the data of the data storage apparatus (or storage server). The client further issues RDMA read/write to the MR. Thereafter, there exist two possible cases, such as a CQ reply of "success", and a CQ reply of "hibernated MR". In the case of CQ reply of "success", the client continues issuing more input/outputs (I/Os) to the MR. While, in the case of the CQ reply of "hibernated MR", the client decides either to contact the server RNIC for the adhoc data access or to tier-up of the data and waits for completion.

The method 100 provides an advanced feature on the RDMA protocol in which it is possible to determine the hibernation status, and even hibernate the MR but instead of triggering a critical error like in conventional systems, the access to this MR from the client will return a special reply on the CQ describing that this MR is in hibernate state. This prevents MR invalidation, and do not impact performance. Thus, in case of "hibernated MR" reply (i.e., by notifying the client of the hibernated status), the client can decide to either contact the data storage apparatus and request a tier-up operation or, if the I/O request is small and infrequent, send the request ad-hoc (via the RPC) to be handled by the data storage apparatus. Thus, the method 100 improves performance of the data storage apparatus in terms of improving data tiering handling capability without impacting the performance or scalability. Moreover, as compared to the conventional approaches, the client needs not to contact the server CPU regarding the availability of data from the MR before each requested memory access. Furthermore, the method 100 provides an optimal solution, because the requested memory access is provided to the client without any additional RTTs, and also without impacting the performance or scalability of access to the first storage tier (hot tier). The method 100 provides hardware-assisted remote direct access to the data storage apparatus (i.e., a multi-tiered storage system).

The steps 102 to 108 are only illustrative, and other alternatives can also be provided where one or more steps are added, one or more steps are removed, or one or more steps are provided in a different sequence without departing from the scope of the claims herein.

In another aspect, the present disclosure provides a computer-readable medium comprising instructions which, when executed by a processor, cause the processor to perform the method 100. In an example, the instructions are implemented on a non-transitory computer-readable medium that includes, but is not limited to, read-only memory (ROM), electrically erasable programmable ROM (EEPROM), random-access memory (RAM), hard disk drive (HDD), flash memory, a Secure Digital (SD) card, SSD, a computer readable storage medium, and/or CPU cache memory. In an example, the instructions are generated by the computer program, which is implemented in view of the method 100, and for use in implementing the method 100 on the data storage apparatus.

Figure 2:
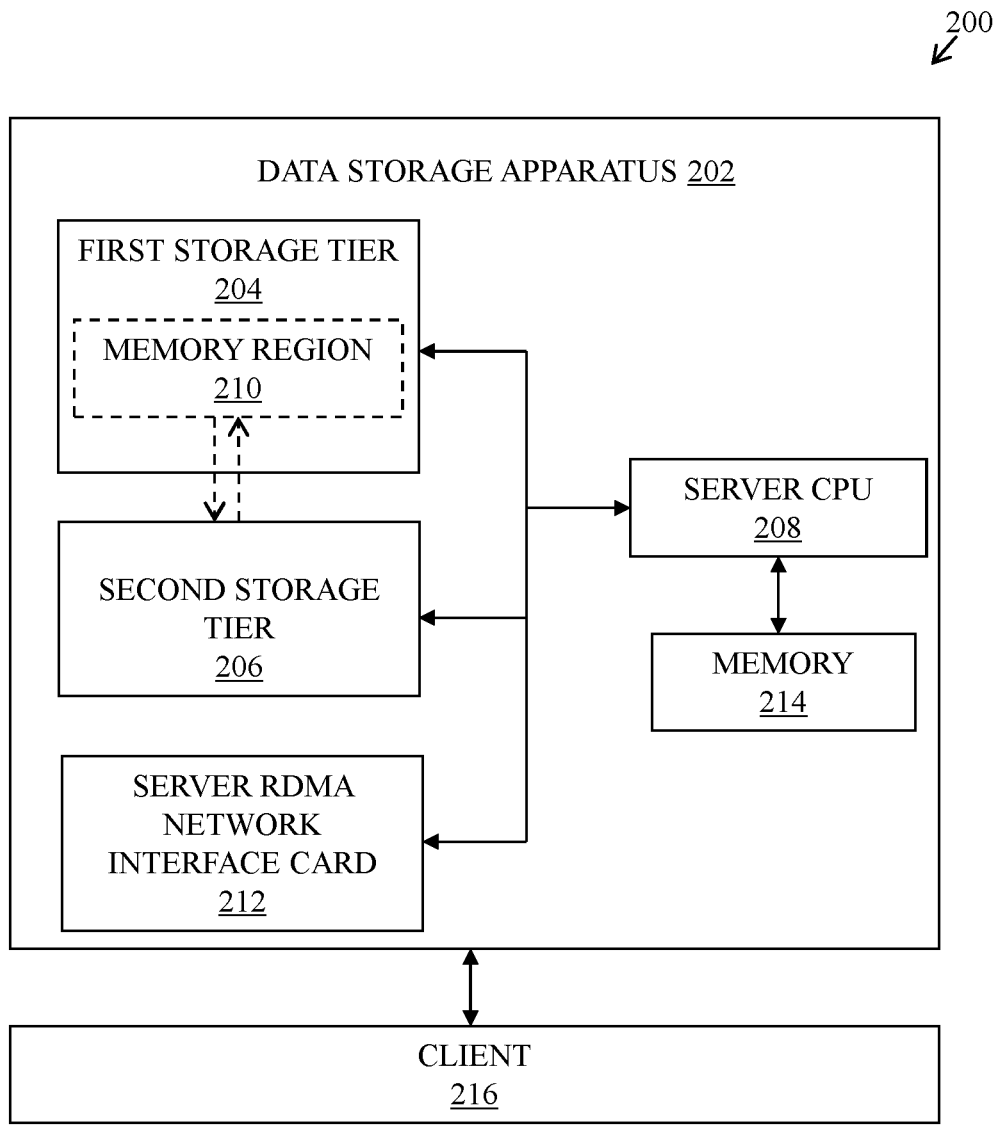
FIG. 2 is a block diagram of a data storage apparatus, in accordance with an embodiment of the present disclosure.

FIG. 2 is a block diagram of a data storage apparatus, in accordance with an embodiment of the present disclosure. With reference to FIG. 2, there is shown a block diagram 200 of a data storage apparatus 202 that includes a first storage tier 204, a second storage tier 206, a server CPU 208, and an MR 210. The data storage apparatus 202 further includes a server RNIC 212, and a memory 214. There is further shown a client 216 in communication with the data storage apparatus 202.

The data storage apparatus 202 comprises the first storage tier 204, the second storage tier 206, and the server CPU 208. The data storage apparatus 202 refers to a computer storage server or a part of the server that stores information (i.e., data such as data files or database files) in a storage medium, such as a storage disk. The data storage apparatus 202 comprises one or more media of multiple types (e.g., the first storage tier 204 and the second storage tier 206), and the server CPU 208 to optimize the overall performance of the data storage apparatus 202. In an implementation, the data storage apparatus 202 may include a dynamic RAM (DRAM) for cache, which serves input-outputs (IOs) very fast. Examples of the data storage apparatus 202 include, but are not limited to, a storage server, a block storage system, a file storage system, an object storage system, or a combination thereof.

The first storage tier 204 refers to a type of computer storage media that has a shorter access time than the second storage tier 206. Hence, the first storage tier 204 allows relatively fast random access for reads and writes. In an implementation, the first storage tier 204 corresponds to persistent memory. Moreover, the first storage tier 204 may also be used for data caching, which refers to storing data such that future requests for that data can be served faster. In an implementation, the first storage tier 204 may refer to a SSD. In an example, the first storage tier 204 is significantly effective and also larger than the cache of the DRAM.

In accordance with an embodiment, the first storage tier 204 is persistent memory. In other words, the first storage tier 204 of the data storage apparatus 202 acts as a hot-data access tier that has a shorter access time. Hence, the first storage tier 204 allows relatively fast random access for reads and writes. Moreover, the first storage tier 204 may also be used for data caching, which refers to storing data such that future requests for that data can be served faster.

The second storage tier 206 refers to a non-volatile type of computer storage media, which has a larger access time than the first storage tier 204. Hence, though the second storage tier 206 has less performance for random IOs as seek times in the second storage tier 206 are very high (e.g., up to 10 milliseconds), the second storage tier 206 allows relatively fast sequential reading and writing. In an implementation, the second storage tier 206 may refer to a HDD.

In accordance with an embodiment, the second storage tier 206 has one or more of a longer latency, lower throughput, and lower cost in comparison with the first storage tier 204. Therefore, the second storage tier 206 has comparatively less performance but a lower than the first storage tier 202, but a lower cost as compared to the first storage tier 204. The second storage tier 206 is flash or spindle or tape memory. Therefore, the second storage tier 206 has a larger access time as compared to the first storage tier 204.

The server CPU 208 refers to a central data processing device (or server) that controls the flow of data across the two tiers of the data storage apparatus 202 (i.e., the first storage tier 204 and the second storage tier 206). The server CPU 208 includes suitable logic, circuitry, interfaces, and/or code that is configured to execute a memory controlling process in the data storage apparatus 202. Examples of implementation of the server CPU 208 may include but are not limited to a central data processing device, a microprocessor, a microcontroller, a complex instruction set computing (CISC) processor, an application-specific integrated circuit (ASIC) processor, a reduced instruction set (RISC) processor, a very long instruction word (VLIW) processor, a state machine, and other processors or control circuitry.

The MR 210 refers to the smallest data segments containing the information requested by a user. The MR 210 comprises one or more sequential memory blocks stored in the data storage apparatus 202. The MR 210 is moved across the two tiers of the data storage apparatus 202 (i.e., the first storage tier 204 and the second storage tier 206).

The server RNIC 212 includes a software or hardware interface that may be configured to establish communication among the server CPU 208, the first storage tier 204, the second storage tier 206, and the memory 114. Examples of the server RNIC 212 may include but are not limited to, a computer port, a network socket, a network interface controller (NIC), and any other network interface device.

The memory 214 includes suitable logic, circuitry, interfaces, or code that is configured to store statistics of the MR 210. Examples of the memory 214 may include but are not limited to, RAM, static RAM (SRAM), dynamic RAM (DRAM), HDD, flash memory, SSD, and/or CPU cache memory.

The client 216 is in communication with the data storage apparatus 202. Examples of the client 216 include but are not limited to a computer, a laptop, and the like that is accessed by a user of the client 216.

In operation, the server CPU 208 is configured to determine that the MR 210 stored in the first storage tier 204 is suitable for hibernation. The determination of suitability for hibernation can be accurately made by the server CPU 208 based on activity on the data stored in the MR.

In accordance with an embodiment, the determination of suitability for hibernation is made based on a data access history for the MR. As the data access history provides an indication whether the data access for the particular MR has been too frequent or infrequent or no recent data access (e.g., based on a number of read and write requests), thus the determination of suitability for hibernation can be accurately made.

In accordance with an embodiment, the MR 210 is determined to be suitable for hibernation when the MR 210 is not recently and/or regularly accessed. In an implementation, if the data access history of the MR 210 is not available (i.e., no data access history exits) that means the MR 210 is not recently accessed and/or not regularly accessed.

The server CPU 208 is further configured to execute a tier-down operation to move the MR 210 to the second storage tier 206. In an example, if the MR 210 is suitable for hibernation, then the server CPU 208 is configured to move the MR 210 from the first storage tier (i.e., hot tier) to the second storage tier 206 (i.e., cold tier), such as by executing the tier-down operation. In an implementation, the tier-down operation is executed by the server CPU 208 of the data storage apparatus 202. The tier-down operation is executed by the server CPU 208 based on the accurate determination of the hibernation status further contributes to reduce total storage costs while ensuring performance.

In accordance with another embodiment, the server CPU 208 is configured to execute the tier-down operation by sending a server CPU call to the server RNIC 212. The server RNIC 212 is configured to update an MR state and wait for one or more RDMA transactions to complete before sending a confirmation response to the server CPU 208. The server CPU 208 is further configured to move the MR 210 to the second storage tier 206 in response to the confirmation response. Firstly, the server CPU 208 further executes the server CPU call to the server RNIC 212 of the data storage apparatus 202, such as to request and to update the MR state. Thereafter, the MR state of the MR 210 is updated by the server RNIC 212. The server RNIC 212 further wait for inflight DMA transactions of the MR 210 to end (i.e., wait for one or more RDMA transactions to complete). After that, the server RNIC 212 returns the confirmation response to the server CPU 208 that the MR state is updated. As a result, the server CPU 208 now aware that no access to the MR 210 can be made and can now safely move the MR 210 from the first storage tier 204 to the second storage tier 206.

In accordance with another embodiment, the server RNIC 212 is further configured to send a hibernate error to the server CPU 208 if one or more new RDMA write operations are incoming, and the server CPU 208 is further configured to determine whether to force or cancel the tier-down operation. In an implementation, the server RNIC 212 waits for inflight DMA transactions of the MR 210 to end. Moreover, at that stage, one or more new RDMA write operations are in flight (i.e., new incoming packets are in flight). Thereafter, the server RNIC 212 sends back the hibernate error (or completion error for hibernation request) to the server CPU 208. The hibernate error allows the server CPU 208 to determine and decide whether to force the tier-down operation or to cancel the tier-down operation (i.e., drop tier-down request) because the MR 210 is now "hot" again. Thus, the server CPU 208 is capable to determine whether to force the tier-down operation or to cancel the tier-down operation, without impacting the performance or scalability of access to the first storage tier. The server CPU 209 is capable to decide if it is required to modify the hibernate status again with a force indication where new inflight packets hitting the MR 210 may be blocked.

The server RNIC 212 is configured to send a notification response to the client 216 to notify the client of the hibernated status of the MR 210 in response to a RDMA request to the MR 210 from the client 216. Typically, the client 216 contacts the data storage apparatus 202, such as through the RDMA request sent from the client 216 to the MR 210. Beneficially, the RDMA request provides one-sided operations (e.g., read, write) that allow access to the memory 214, and to the MR 210 without involving the server CPU 208 at the data storage apparatus 202. Thus, in response to the RDMA request, the server RNIC 212 returns the notification response to the client 216 that the MR 210 is in hibernate state.

In accordance with another embodiment, the RDMA request is a read or write request including an RDMA key and virtual address of the corresponding data. In an implementation, the RDMA key (i.e., r_key) is a registered key that is configured to store the read or write request. Moreover, the virtual address may guide the client to the MR 210 of the corresponding data. Beneficially, the client 216 can now access the corresponding data from the MR 210 with one-sided read or write operations without involving the server CPU 208 of the data storage apparatus 202.

In accordance with another embodiment, the notification response comprises a work completion error, which is configured not to tear down a connection to the client 216. Beneficially, the notification response that includes the work completion error prevents invalidation of the QP connection without affecting any performance of orthogonal input/output (I/O) operations from other threads to other MRs that use the same connection (e.g., QP connection).

The server CPU 208 is further configured to provide the requested memory access to the client 216 in response to receiving a RPC from the client 216. In other words, the client 216 is configured to send the RPC to the server CPU 208. The RPC is used to provide the requested memory access to the client 216. Therefore, the data storage apparatus 202 is optimal, because the requested memory access is provided to the client without any additional RTTs. Moreover, the overall performance of the data storage apparatus 202 is improved in terms of improving data tiering handling capability without impacting the performance or scalability.

In accordance with another embodiment, the client RPC includes an RDMA key, virtual address and logical offset of the corresponding data. Therefore, the client 216 can now access the corresponding data from the MR 210 without involving the server CPU 208 of the data storage apparatus 202 in a simplified manner.

In accordance with another embodiment, the client RPC includes a request for adhoc data access and the server CPU 208 is configured to provide the requested memory access indirectly from the second storage tier 206. The requested memory access of the MR 210 is provided indirectly by the server CPU 208 of the data storage apparatus 202 from the second storage tier 206 without impacting performance related to access to the first storage tier 204.

In accordance with another embodiment, the client RPC includes a request for tier-up of the MR 210, and the server CPU 208 is configured to provide the requested memory access by executing a tier-up operation. The notification response is sent to the client 216 by the server RNIC 212 of the data storage apparatus 202. Thereafter, the client 216 may decides to contact the server RNIC 212 of the data storage apparatus 202 and also to send the RPC for tier-up of the MR 210. As a result, the requested memory access is provided to the client 216 through the tier-up operation, such as to move the MR 210 from the second storage tier 206 to the first storage tier 204.

In accordance with another embodiment, the server CPU 208 is configured to execute the tier-up operation by sending a server CPU call to the server RNIC 212, and the server RNIC 212 is configured to updated an MR state and assign a virtual address to the MR 210. Firstly, the server CPU 208 of the data storage apparatus 202 decides to execute the tier-up operation, such as to move the MR 210 from the second storage tier 206 to the first storage tier 204. The server CPU 208 further moves the data to a specific virtual address of the first storage tier 204. After that, the server CPU 208 executes the server CPU call to the server RNIC 212 of the data storage apparatus 202, such as to request that the MR 210 will be moved to wakeup state and at a specific virtual address and PA mapping. In an example, the MR 210 is moved to the wakeup state at a previously registered specific virtual address of the data. In another example, the MR 210 is moved to the wakeup state at the specific virtual address, which can be different from the previously registered virtual address of the data. Thereafter, the MR state of the MR 210 is updated by the server RNIC 212 and also informed the client 216 that the MR 210 is now woken up. The server CPU 208 further shares the virtual address to the MR 210 to the client 216. As a result, the client 216 can access the MR 210, such as through an originally registered key (i.e., the RDMA key (r_key)).

In accordance with another embodiment, the server RNIC 212, is further configured to map from a former virtual address to the newly assigned virtual address. The client 216 can access the MR 210 through the newly assigned virtual address. In an example, the client 216 can access the MR with a previous remote MR information with no change.

In accordance with another embodiment, the server CPU 208 is further configured to send a RPC to the client 216 to notify the client 216 of the completion of the tier-up operation. The server CPU 208 is configured to execute the tier-up operation, where the RPC is sent by the server CPU 208 to the client 216, such as to notify the client 216 that the tier-up operation is completed. The RPC may be leveraged for providing the requested memory access to the client 216.

The data storage apparatus 202 provides an advanced feature on the RDMA protocol in which it is possible to determine the hibernation status, and even hibernate the MR 210 but instead of triggering a critical error like in conventional systems, the access to this MR from the client 216 will return a special reply on the CQ describing that this MR is in hibernate state. This prevents MR invalidation, and do not impact performance. Thus, in case of "hibernated MR" reply (i.e., by notifying the client of the hibernated status), the client 216 can decide to either contact the data storage apparatus 202 and request a tier-up operation or, if the I/O request is small and infrequent, send the request ad-hoc (via the RPC) to be handled by the data storage apparatus 202. Thus, overall performance of the data storage apparatus 202 is improved in terms of improving data tiering handling capability without impacting the performance or scalability. Moreover, as compared to the conventional approaches, the client 216 needs not to contact the server CPU 208 regarding the availability of data from the MR 210 before each requested memory access. Furthermore, the requested memory access is provided to the client 216 without any additional RTTs, and without impacting the performance or scalability of access to the first storage tier 204 (hot tier).

Moreover, there exists a hardware-assisted remote direct access to the data storage apparatus 202 (i.e., a multi-tiered storage system).

Figure 3:
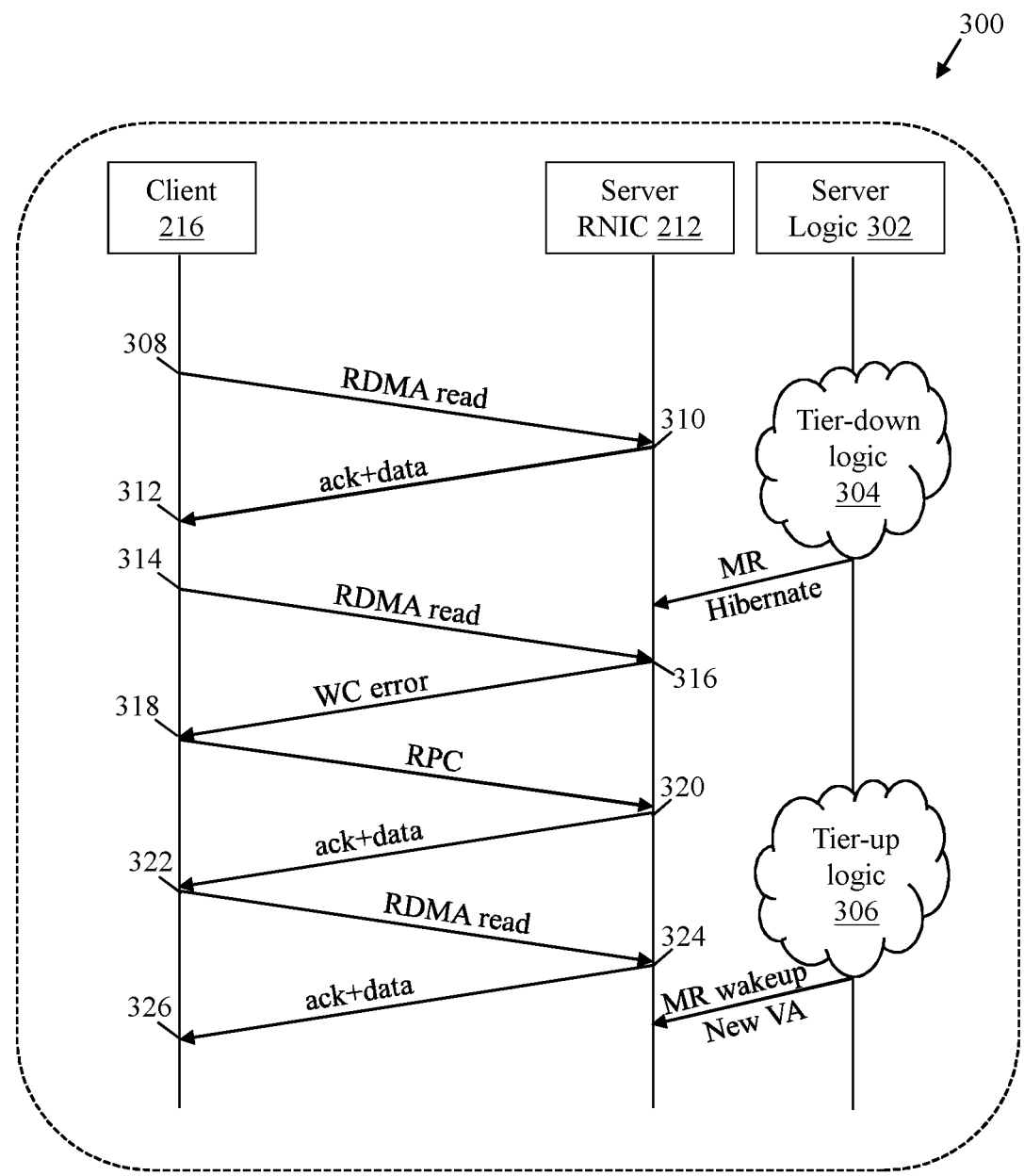
FIG. 3 is a sequence diagram that depicts an interaction process between a client and a server RNIC, in accordance with an embodiment of the present disclosure.

FIG. 3 is a sequence diagram that depicts an interaction process between a client and a server RNIC, in accordance with an embodiment of the present disclosure. FIG. 3 is described in conjunction with elements from FIGS. 1 and 2. With reference to FIG. 3, there is shown a sequence diagram 300 that depicts the client 216 and the server RNIC 212. The sequence diagram 300 includes steps 308 to 326. There is further shown a server logic 302, a tier-down logic 304, and a tier-up logic 306. In an implementation, the server logic 302 corresponds to the server CPU 208 (of FIG. 2). Further, the tier-down logic 304, and the tier-up logic 306 are logical circuits that are configured to perform logical operations. For example, the tier-down logic 304 is configured to execute tier-down operation to move the MR 210 (of FIG. 2) from the first storage tier 204 to the second storage tier 206, and the tier-up logic 306 is configured to execute tier-up operation to move the MR 210 (of FIG. 2) from the second storage tier 206 to the first storage tier 204.

At step 308, the client 216 sends a RDMA read request to the server RNIC 212 (e.g., RDMA read request to the MR 210 of FIG. 2). In an example, the RDMA read request includes an RDMA key and a virtual address of data of the MR.

At step 310, the server RNIC 212 receives and reads the RDMA read request. After that, the server RNIC 212 share an acknowledgment message as well as data to the client 216. In addition, the server logic 302 (or the server CPU 208) is configured to determine that the MR 210 is suitable for hibernation or not. In case, the MR 210 is suitable for hibernation, then the server logic 302 (or the server CPU 208) to execute the tier-down logic 304, such as to move the MR 210 from the first storage tier 204 to the second storage tier 206. The tier-down logic 304 further informs the server RNIC 212 that the MR 210 is now in a hibernated state.

At step 312, the client 216 receives the acknowledgment message as well as the data from the server RNIC 212.

At step 314, the client 216 sends the RDMA read request to the server RNIC 212.

At step 316, the server RNIC 212 receives and reads the RDMA read request. In an implementation, there exists a work completion (WC) error. Therefore, the server RNIC 212 share a notification response to the client 216, where the notification response includes the work completion error. The work completion error is configured not to tear down a connection with the client 216.

At step 318, the client 216 receives the notification response includes the work completion error from the server RNIC 212. The client 216 further sends a RPC to the server RNIC 212. In an example, the RPC includes an RDMA key, a virtual address, and a logical offset of the corresponding data from the MR 210. In another example, the RPC includes a request for an adhoc data access of the corresponding data from the MR 210. In yet another example, the RPC includes a request for tier-up of the MR 210.

At step 320, the server RNIC 212 receives and reads the RPC from the client 216. After that, the server RNIC 212 share an acknowledgment message as well as data to the client 216.

At step 322, the client 216 receives the acknowledgment message as well as the data from the server RNIC 212. After that, the client 216 sends the RDMA read request to the server RNIC 212.

At step 324, the server RNIC 212 receives and reads the RDMA read request. After that, the server RNIC 212 share an acknowledgment message as well as data to the client 216. In addition, the server logic 302 (or the server CPU 208) is configured to determine that the MR 210 is in a wakeup state. In case, the MR 210 is in the wakeup state, then the server logic 302 (or the server CPU 208) to execute the tier-up logic 306, such as to move the MR 210 from the second storage tier 206 to the first storage tier 204. In an implementation, the tier-up logic 306 is executed to map the server RNIC 212 from a former virtual address to the newly assigned virtual address. The tier-up logic 306 further informs the server RNIC 212 that the MR 210 is now in the wakeup state.

At step 326, the client 216 receives the acknowledgment message as well as the data from the server RNIC 212. As a result, the client 216 receives the requested memory access through the server RNIC 212.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A method comprising:
   determining that a memory region (MR) stored in a first storage tier is suitable for hibernation;
   executing, by a server central processing unit (CPU) of a data storage apparatus, a tier-down operation to move the MR to a second storage tier by:
   sending a server CPU call to a server remote direct memory access (RDMA) network interface card (RNIC) of the data storage apparatus;
   updating, by the server RNIC, an MR state and waiting for one or more RDMA transactions to complete before sending a confirmation response to the server CPU; and
   moving the MR to the second storage tier in response to the confirmation response;
   sending, by the RNIC to a client in response to an RDMA request to the MR from the client, a notification response to the client to notify the client of a hibernated status of the MR;
   receiving, from the client, a client remote procedure call (RPC); and
   providing, in response to receiving the client RPC, a requested memory access to the client.

2. The method of claim 1, wherein determining that the MR stored in the first storage tier is suitable for hibernation comprises determining, by the server CPU, that the MR stored in the first storage tier is suitable for hibernation.

3. The method of claim 1, wherein determining that the MR stored in the first storage tier is suitable for hibernation comprises determining that the MR stored in the first storage tier is suitable for hibernation is based on a data access history for the MR.

4. The method of claim 3, wherein determining that the MR stored in the first storage tier is suitable for hibernation comprises determining that the MR stored in the first storage tier is suitable for hibernation when the MR is not recently or regularly accessed.

5. The method of claim 1, wherein executing the tier-down operation further comprises:
   sending, by the server RNIC, a hibernate error to the server CPU when one or more new RDMA write operations are incoming; and
   determining, by the server CPU and based on the hibernate error, whether to force or cancel the tier-down operation.

6. The method of claim 1, wherein the first storage tier is persistent memory.

7. The method of claim 1, wherein the second storage tier has one or more of a longer latency, a lower throughput, or a lower cost in comparison with the first storage tier.

8. The method of claim 7, wherein the second storage tier is one of flash memory, spindle data storage, or tape memory.

9. The method of claim 1, wherein the RDMA request is a read request or write request including an RDMA key and a virtual address of corresponding data.

10. The method of claim 1, wherein the notification response comprises a work completion error configured not to tear down a connection to the client.

11. The method of claim 1, wherein the client RPC comprises an RDMA key, a virtual address, and a logical offset of corresponding data.

12. The method of claim 1, wherein the client RPC comprises a request for adhoc data access, and wherein the requested memory access is from the server CPU from the second storage tier.

13. The method of claim 1, wherein the client RPC comprises a request for tier-up of the MR, and wherein providing the requested memory access to the client comprises providing, by executing a tier-up operation, the request memory access to the client.

14. A data storage apparatus comprising:
    a first storage tier;
    a second storage tier;
    a server central processing unit (CPU) in communication with the first storage tier and the second storage tier, wherein the server CPU is configured to:
    determine that a memory region (MR) stored in the first storage tier is suitable for hibernation;
    execute a tier-down operation to move the MR to the second storage tier by sending a server CPU call;
    move the MR to the second storage tier in response to a confirmation response;
    receive, from a client, a client remote procedure call (RPC); and
    provide a requested memory access to the client in response to receiving the client RPC; and
    a server remote direct memory access (RDMA) network interface card (RNIC) in communication with the server CPU, wherein the server RNIC is configured to:
    receive the server CPU call from the server CPU;

update an MR state and wait for one or more RDMA transactions to complete before sending the confirmation response to the server CPU; and send, in response to an RDMA request to the MR from the client, a notification response to the client to notify the client of a hibernated status of the MR.

15. The data storage apparatus of claim 14, wherein the server CPU is further configured to further determine that the MR stored in the first storage tier is suitable for hibernation based on a data access history for the MR.

16. The data storage apparatus of claim 15, wherein the server CPU is further configured to further determine that the MR stored in the first storage tier is suitable for hibernation when the MR is not recently or regularly accessed.

17. A method comprising:
   determining that a memory region (MR) stored in a first storage tier is suitable for hibernation;
   executing a tier-down operation to move the MR to a second storage tier;
   sending, in response to a remote direct memory access (RDMA) request to the MR from a client, a notification response to the client to notify the client of a hibernated status of the MR;
   receiving, from the client, a client remote procedure call (RPC), wherein the client RPC comprises a request for ad-hoc data access; and
   providing, in response to receiving the client RPC, a requested memory access to the client, wherein the requested memory access is from a server CPU of a data storage apparatus from the second storage tier.

18. The method of claim 17, wherein determining that the MR stored in the first storage tier is suitable for hibernation comprises determining, by the server CPU, that the MR stored in the first storage tier is suitable for hibernation.

19. The method of claim 17, wherein determining that the MR stored in the first storage tier is suitable for hibernation comprises determining that the MR stored in the first storage tier is suitable for hibernation is based on a data access history for the MR.

20. The method of claim 19, wherein determining that the MR stored in the first storage tier is suitable for hibernation comprises determining that the MR stored in the first storage tier is suitable for hibernation when the MR is not recently or regularly accessed.

* * * * *